United States Patent
Kim et al.

(10) Patent No.: US 10,460,273 B2
(45) Date of Patent: Oct. 29, 2019

(54) APPARATUS AND METHOD FOR FIELD SERVICE MONITORING

(71) Applicants: Sun Kyoung Kim, Seoul (KR); Kwang Jin So, Seoul (KR); Kyung Soo Yoo, Seoul (KR)

(72) Inventors: Sun Kyoung Kim, Seoul (KR); Kwang Jin So, Seoul (KR); Kyung Soo Yoo, Seoul (KR); Dong il Park, Dongducheon-si (KR)

(73) Assignees: Sun Kyoung Kim, Seoul (KR); Kwang Jin So, Seoul (KR); Kyung Soo Yoo, Seoul (KR)

( * ) Notice: Subject to any disclaimer, the term of this patent is extended or adjusted under 35 U.S.C. 154(b) by 0 days.

(21) Appl. No.: 15/927,878

(22) Filed: Mar. 21, 2018

(65) Prior Publication Data
US 2018/0276591 A1    Sep. 27, 2018

(30) Foreign Application Priority Data
Mar. 21, 2017   (KR) .................. 10-2017-0035458

(51) Int. Cl.
*G06Q 10/06* (2012.01)
(52) U.S. Cl.
CPC ........... *G06Q 10/06393* (2013.01); *G06Q 10/063114* (2013.01)
(58) Field of Classification Search
CPC .............................................. G06Q 10/06393
See application file for complete search history.

(56) References Cited

U.S. PATENT DOCUMENTS

| 8,209,218 B1 * | 6/2012 | Basu | G06Q 10/0637 |
| | | | 705/7.36 |
| 8,364,519 B1 * | 1/2013 | Basu | G06Q 10/06393 |
| | | | 705/7.38 |

(Continued)

FOREIGN PATENT DOCUMENTS

| JP | 2005-148930 A | 6/2005 |
| JP | 4445057 B2 | 4/2010 |

(Continued)

OTHER PUBLICATIONS

Thomas Richter, Analysis and Optimization of Mobile Business Processes, Dissertation, Essen (2012).*

*Primary Examiner* — Andre D Boyce
(74) *Attorney, Agent, or Firm* — Knobbe Martens Olson & Bear LLP

(57) ABSTRACT

Apparatus and method for field service monitoring are disclosed. The apparatus includes a communication unit and a control unit. The communication unit receives schedule information, real-time location information, and service status information including service completion information for each worker. The control unit determines a visit type of a service using the schedule information and the real-time location information. When the determined visit type is the non-requested visit, the control unit calculates a first achievement score having a penalty score for a non-requested visit. When the determined visit type is a requested visit, the control unit calculates a second achievement score having a new service completion rate for each worker using the schedule information and the service status information. The control unit calculates a key performance indicator (KPI) for each worker using the first and second achievement scores, and evaluates a working status of each worker using the calculated KPI.

8 Claims, 3 Drawing Sheets

(56) References Cited

U.S. PATENT DOCUMENTS

2013/0054294 A1* 2/2013 Vuylsteke ............ G06Q 10/109
                                                    705/7.18
2015/0142491 A1* 5/2015 Webb ............. G06Q 10/063114
                                                    705/7.15

FOREIGN PATENT DOCUMENTS

| KR | 10-2003-0096139 A | 12/2003 |
| KR | 10-1764928 B1 | 7/2017 |
| KR | 10-1778066 B1 | 9/2017 |

* cited by examiner

APPARATUS AND METHOD FOR FIELD SERVICE MONITORING

CROSS-REFERENCE TO RELATED APPLICATIONS

This application claims priority from Korean Patent Applications No. 10-2017-0035458 filed on Mar. 21, 2017, the entire disclosure of which is hereby incorporated by reference.

TECHNICAL FIELD

The present disclosure relates to a monitoring apparatus and method. More particularly, the present disclosure relates to a field service monitoring apparatus and method for monitoring a worker's service visit in real time and evaluating a worker's working status by calculating a key performance indicator (KPI) from monitoring results.

BACKGROUND

In a field service monitoring system, a central monitoring apparatus provides various management functions such as real-time location tracking for each worker, past travel route tracking for each worker, definition of a service area for each worker, and monitoring a worker's deviation from a service area or an invasion of other service area.

However, such a typical field service monitoring system is operated on the basis of each worker's visit plan and route schedule, which are written by hand, and a worker's voluntary decision. Therefore, it is difficult for a manager to accurately grasp a working status of each service worker, and even if the working status is grasped, the basis of an evaluation standard is insufficient.

SUMMARY

An aspect of the present invention provides a field service monitoring apparatus and method for monitoring a service process of each worker performing a field service in real time and calculating a KPI from monitoring results.

Another aspect of the present invention to provide a field service monitoring apparatus and method for evaluating a working status of each worker efficiently and objectively.

According to various embodiments of the present invention, a field service monitoring apparatus may comprise a communication unit configured to receive schedule information, real-time location information, and service status information including service completion information with respect to a plurality of workers, and a control unit configured to determine a visit type of a service for each worker by using the schedule information and the real-time location information, to calculate a first achievement score having a penalty score for a non-requested visit when the determined visit type is the non-requested visit, to calculate a second achievement score having a new service completion rate for each worker by using the schedule information and the service status information when the determined visit type is a requested visit, to calculate a key performance indicator (KPI) for each worker by using the first and second achievement scores, and to evaluate a working status of each worker by using the calculated KPI.

The control unit may be further configured to classify the requested visit into a new visit and a revisit, and to classify the revisit into a reschedule visit and a reclaim visit, the reschedule visit being made after no completion of a service in the new visit, and the reclaim visit being made for a same reason after completion of the service.

The control unit may be further configured to calculate a third achievement score having a penalty score for reclaim when the revisit is the reclaim visit, and to calculate the KPI by further using the third achievement score.

The control unit may be further configured to calculate the second achievement score by using Equation below.

Second achievement score={the total number of visits−(the number of uncompleted services in new visits+the number of revisits)}/the total number of visits, [Equation]

where the total number of visits denotes the sum of new visits and revisits.

The control unit may be further configured to determine the reclaim visit as the new visit when a worker performing the reclaim visit is not a previous visit worker for a same service and a same customer.

The control unit may be further configured to determine a visit time by using the real-time location information, to calculate a fourth achievement score reflecting a visit time compliance state by using the determined visit time, and to calculate the KPI by further using the fourth achievement score.

The control unit may be further configured to determine that the visit time compliance state is a good state when the visit time falls within a time range defined in the schedule information, and to determine that the visit time compliance state is a poor state when the visit time exceeds the time range.

The time range may be defined in the schedule information so that a visit time range for a certain service is overlapped with at least one of a visit time range for the previous service and a visit time range for the next service.

The control unit may be further configured to calculate a fifth achievement score reflecting a safe driving state of each worker, based on a traveling speed of each worker's vehicle determined using the real-time location information, to calculate a sixth achievement score reflecting an eco-driving state, based on idling and a traveling distance of the vehicle determined using a traveling history of the vehicle, to calculate a seventh achievement score reflecting a worker's abnormal behavior, based on a traveling history and an oiling record of the vehicle, and to calculate the KPI by further using at least one of the fifth, sixth, and seventh achievement scores.

The control unit may be further configured to generate a point indicating a worker's current location and a current time by using the real-time location information, to generate a virtual region surrounding the generated point, and to determine that a stop event occurs when a predetermined number of virtual regions are overlapped with each other for a given time.

According to various embodiments of the present invention, a field service monitoring method may comprise at a field service monitoring apparatus, receiving schedule information with respect to a plurality of workers performing field services; at the field service monitoring apparatus, receiving real-time location information with respect to the plurality of workers; at the field service monitoring apparatus, determining a visit type of a service for each worker by using the schedule information and the real-time location information; at the field service monitoring apparatus, calculating a first achievement score having a penalty score for a non-requested visit when the determined visit type is the non-requested visit, and calculating a second achievement score having a new service completion rate for each worker by using the schedule information and the service status information when the determined visit type is a requested visit; at the field service monitoring apparatus, classifying the requested visit into a new visit and a revisit, classifying the revisit into a reschedule visit and a reclaim visit, and calculating a third achievement score having a penalty score for reclaim when the revisit is the reclaim visit, wherein the reschedule visit is made after no completion of a service in the new visit, and wherein the reclaim visit is made for a same reason after completion of the service; at the field service monitoring apparatus, calculating a key performance indicator (KPI) for each worker by using the first, second, and third achievement scores; and at the field service monitoring apparatus, evaluating a working status of each worker by using the calculated KPI.

According to the field service monitoring apparatus and method, it is possible to monitor service processes of workers performing field services through schedule information, real-time location information such as GPS information, and current service status information. Also, it is possible to calculate the KPI for a predefined index by using the monitoring results and thus to provide a basis for objectively evaluating the working status of each worker.

In addition, according to the field service monitoring apparatus and method, it is possible to evaluate the working status of each worker by means of numerical data, to check efficiently and objectively an improvement-required matter or an indicated matter of each work, and to induce the worker to supplement deficient parts.

DETAILED DESCRIPTION

Figure 1:
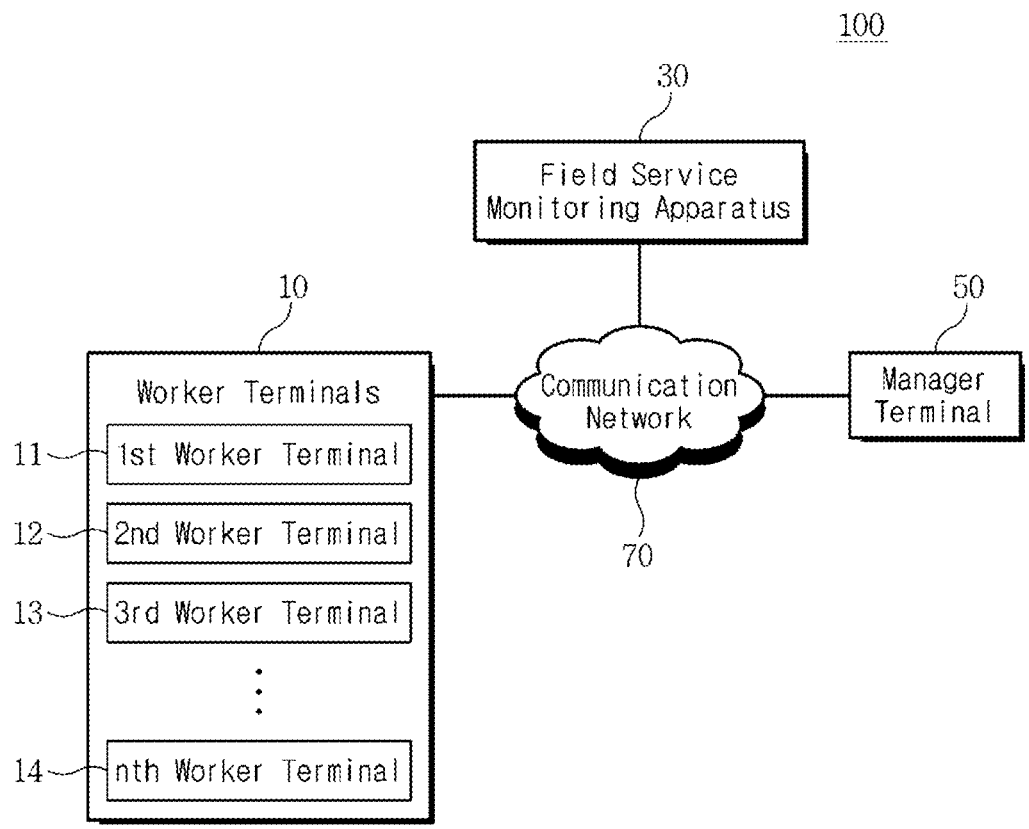
FIG. 1 is a block diagram illustrating a field service monitoring system according to an embodiment of the present invention.

Hereinafter, embodiments of the present invention will be described in detail with reference to the accompanying drawings.

In the following description of embodiments, descriptions of techniques that are well known in the art and not directly related to the present disclosure are omitted. This is to clearly convey the subject matter of the present disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

In addition, terms used herein are defined in consideration of functions of this disclosure and may be varied depending on a user or an operator's intention or custom. Therefore, the definition should be made based on the contents throughout this description.

FIG. 1 is a block diagram illustrating a field service monitoring system according to an embodiment of the present invention.

Referring to FIG. 1, the field service monitoring system 100 monitors in real time a service process of each worker performing a field service, calculates a key performance indicator (KPI) by using monitoring results, and evaluates a working status of each worker. Through this, the field service monitoring system 100 may check an improvement-required matter or an indicated matter for each individual worker and thus improve the quality of a service. The field service monitoring system 100 includes a plurality of worker terminals 10, a field service monitoring apparatus 30, and a manager terminal 50.

Each of the worker terminals 10 collects information about a service process of each individual worker in real time. That is, with respect to each individual worker, a corresponding one of the worker terminals 10 collects and stores schedule information, real-time location information such as global positioning system (GPS) information, and current service status information including service completion information.

For example, the plurality of worker terminals 10 may include a first worker terminal 11 used by a first worker, a second worker terminal 12 used by a second worker, a third worker terminal 13 used by a third worker, and an nth worker terminal 14 used by an nth worker. In this case, the first to nth worker terminals 10 collect and store real-time information about service processes of the first to nth workers, respectively.

In order to perform the above-described functions, each of the worker terminals 10 may be a device that includes a communication module, a location tracking module such as a GPS module, a speed calculation module, and the like. Preferably, the worker terminal 10 may be a mobile terminal such as a smart phone, a tablet PC, or a handheld PC. Further, the worker terminal 10 may be carried by a worker or mounted on a worker's vehicle.

The field service monitoring apparatus 30 receives the schedule information, the real-time location information such as the GPS information, and the current service status information with respect to respective workers from the plurality of worker terminals 10, and monitors a service process of each worker by using the received information.

The field service monitoring apparatus 30 calculates the KPI for a predefined index by using the monitoring results. That is, the field service monitoring apparatus 30 generates objective evaluation data by quantifying a service process of each worker. For example, the field service monitoring apparatus 30 may calculate the KPI for each field service occurrence or on a time basis such as daily, weekly, monthly, or yearly.

The field service monitoring apparatus 30 evaluates the working status of each worker by using the calculated KPI, and generates working status evaluation results for respective workers. For example, the field service monitoring apparatus 30 performs a customized evaluation per worker by using an achievement score for each index of the KPI. Therefore, the worker can check an index having high performance, an index requiring improvement in performance, and the like, thus improving the quality of service.

The field service monitoring apparatus 30 may be a computing system including a laptop computer, a desktop computer, a server computer, a cluster computer, and the like.

The manager terminal 50 receives the working status evaluation results for respective workers from the field service monitoring apparatus 30. The manager terminal 50 outputs the received working status evaluation results for respective workers so that a manager can check the results. Therefore, the manager can check a working status of each worker at any time and place.

The manager terminal 50 may be a mobile terminal such as a smart phone, a tablet PC, or a handheld PC, or a computing system such as a laptop computer or a desktop computer.

Meanwhile, the field service monitoring system 100 further includes or uses a communication network 70 for transmission/reception of information among each of the worker terminals 10, the field service monitoring apparatus 30, and the manager terminal 50. The communication network 70 may be composed of a backbone network and a subscriber network. The backbone network may be formed of one of an X.25 network, a Frame Relay network, an ATM network, a multi protocol label switching (MPLS) network, and a generalized multi protocol label switching (GMPLS) network, or an integrated network thereof. The subscriber network may be or use a fiber to the home (FTTH), an asymmetric digital subscriber line (ADSL), a cable network, a Zigbee, a Bluetooth, a wireless LAN (IEEE 802.11b, IEEE 802.11a, IEEE 802.11g, IEEE 802.11n), a wireless Hart (ISO/IEC62591-1), an ISA100.11a (ISO/IEC 62734), a constrained application protocol (COAP), a multi-client publish/subscribe messaging (MQTT), a wireless broadband (WIBRO), a Wimax, a 3G, a high speed downlink packet access (HSDPA), a 4G, or a 5G which is the next generation communication network. In some embodiments, the communication network 70 may be Internet or a mobile communication network.

Figure 2:
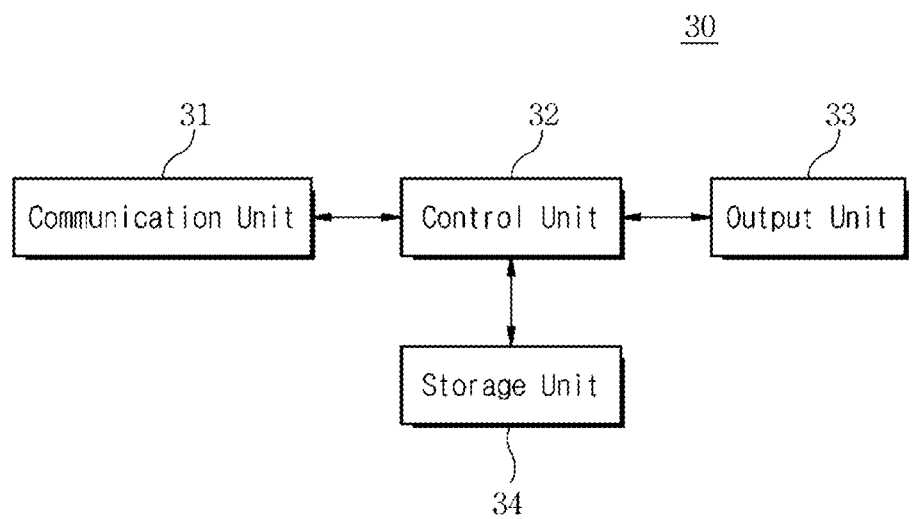
FIG. 2 is a block diagram illustrating a field service monitoring apparatus according to an embodiment of the present invention.

FIG. 2 is a block diagram illustrating a field service monitoring apparatus according to an embodiment of the present invention.

Referring to FIGS. 1 and 2, the field service monitoring apparatus 30 may include a communication unit 31 and a control unit 32. Optionally, the field service monitoring apparatus 30 may further include an output unit 33 and a storage unit 34.

The communication unit 31 receives, from the plurality of worker terminals 10, schedule information, real-time location information such as GPS information, and current service status information with respect to the plurality of workers. In addition, the communication unit 31 transmits, to the manager terminal 50, the working status evaluation results for respective workers generated by the control unit 32.

The control unit 32 calculates the KPI for a predefined index by using the schedule information, real-time location information such as the GPS information, and the service status information, which are received from the communication unit 31, and evaluates a working status of each worker by using the calculated KPI.

For example, the control unit 32 may calculate the achievement scores for the seven indexes, and may calculate the KPI by using the calculated achievement scores.

The control unit 32 determines a visit type of a service for each worker by using the schedule information and the real-time location information such as the GPS information. The control unit 32 defines a first index as an index regarding a non-requested visit. If the visit type is a non-requested visit (a non-scheduled visit, not associated with a reservation), the control unit 32 calculates a first achievement score to which a penalty score with respect to the non-requested visit is applied. In addition, the control unit 32 defines a second index as an index regarding a new service completion rate (also referred to as a repair turn around time (RTAT)) that indicates a service completion rate in a new visit. If the visit type is a requested visit (a scheduled associated with a reservation), the control unit 32 calculates, by using the schedule information and the service status information, a second achievement score to which the new service completion rate for each worker is applied.

Specifically, the control unit 32 classifies visit types into the non-requested visit and the requested visit. In this disclosure, the non-requested visit means a (non-scheduled, no-reservation) visit not included in a worker's schedule, and the requested visit means a (scheduled) visit included in a worker's schedule. Based on the schedule information and the real-time location information such as the GPS information, the control unit 32 may determine whether the visit type is the non-requested visit or the requested visit. That is, the control unit 32 may identifies a stop event by using the real-time location information of a worker. If the identified stop event fails to indicate an area included in the schedule information, the control unit 32 determines that a worker's visit type is the non-requested visit. On the other hand, if the identified stop event indicates an area included in the schedule information, the control unit 32 determines that a worker's visit type is the requested visit. The stop event will be described in detail in FIG. 3.

If it is determined that a worker's visit type is the non-requested visit, the control unit 32 applies the penalty score. That is, the non-requested visit (non-scheduled visit) means an unauthorized or abnormal visit based on personal contact between a worker and a customer without a formal acceptance (reservation). In case of the non-requested visit, the control unit 32 distinguishes it from the requested visit and calculates the first achievement score to which the penalty score is applied. Normally, the penalty score may be a minus (−) score.

As above, the manager can perform monitoring whether the worker visits a customer to provide a service without a formal acceptance. Also, the manager can give a penalty when the worker conducts the non-requested visit, thereby inducing the worker not to conduct the non-requested visit.

When a worker's visit type is the requested visit, the control unit 32 may further determine whether the visit type is a new visit and a revisit. In this disclosure, the new visit means a visit requested initially (a visit reserved for the first time about an issue of a visitor), and the revisit means a visit requested (reserved) more than twice for the same reason (issue) of the same visitor. Using the schedule information, the control unit 32 may determine whether the requested visit is a new visit or a revisit. Also, using the service status information, the control unit 32 may check a service completion status and calculate the second achievement score. Equation 1 may be used to calculate the second achievement score.

Second achievement score={the total number of visits−(the number of uncompleted services in new visits+the number of revisits)}/the total number of visits  [Equation 1]

In Equation 1, the total number of visits means the sum of new visits and revisits. That is, as can be seen from Equation 1, the control unit 32 calculates the second achievement score from the number of new visits excluding the number of revisits among the total number of visits and also from the number of uncompleted services even among the new visits. Thus, the control unit 32 induces the workers to complete their services in the new visits to obtain high second achievement scores.

The control unit 32 classifies the revisits into a reschedule visit and a reclaim visit. In this disclosure, the reschedule visit means a visit that is made within a certain time after no completion of a service in a previous new visit, and the reclaim visit means a visit that is made for the same reason (issue) within a certain time after completion of a service in a previous visit. The control unit 32 defines a third index as an index regarding the reclaim visit. If the revisit is the reclaim visit, the control unit 32 calculates a third achievement score to which a penalty score for reclaim on the KPI of the previous visit worker is applied. If the worker performing the reclaim visit is not the previous visit worker for the same service and the same customer, the control unit 32 may determine the reclaim visit as a new visit so that the current visit worker does not receive the penalty score. That is, the control unit 32 can prevent the worker from receiving an unfair penalty score.

The control unit 32 defines a fourth index as an index regarding a visit time compliance state. In addition, the control unit 32 determines a visit time by using the real-time location information such as the GPS information, and calculates a fourth achievement score reflecting the visit time compliance state by using the determined visit time.

For example, if the visit time falls within a time range defined in the schedule information, the control unit 32 determines that the visit time compliance state is a good state. On the other hand, if the visit time exceeds the time range, the control unit 32 determines that the visit time compliance state is a poor state. The control unit 32 may calculate the fourth achievement score so that the achievement score is higher in the good state than in the poor state. Preferably, the control unit 32 may classify poor states by error ranges and calculate the fourth achievement score to be lower as the error range becomes larger. Further, if the visit time is earlier than the time range defined in the schedule information, the control unit 32 may determine this visit as a recommended action, give a performance score, and then calculate the fourth achievement score. Here, the performance score may be a positive (+) score.

Meanwhile, the time range may be defined in the schedule information so that a visit time range for a certain service is overlapped with a visit time range for the previous service and/or a visit time range for the next service. This allows the worker to flexibly adjust and use a visit time based on a field situation. That is, the worker can perform an efficient field service while complying with the visit time. For example, the time range defined in the schedule information may apply a 2-hour compliance rule. This will be described in detail in FIG. 4.

The control unit 32 defines a fifth index regarding safe driving. Specifically, the control unit 32 calculates speed information by using the real-time location information such as the GPS information, and then determines a traveling speed of each worker's vehicle. Using the determined traveling speed, the control unit 32 calculates a fifth achievement score that reflects a safe driving state of the worker.

For example, the control unit 32 compares the speed limit specified on the road with the determined traveling speed of the vehicle and determines whether the vehicle travels at a specified speed. If the vehicle is traveling at the specified speed, the control unit 32 determines that the safe driving state is a good state. If the vehicle is not traveling at the specified speed, the control unit 32 determines that the safe driving state is a poor state. Then, the control unit 32 may calculate the fifth achievement score so that the achievement score is higher in the good state than in the poor score. Preferably, the control unit 32 may classify poor states by error ranges and calculate the fifth achievement score to be lower as the error range becomes larger.

The control unit 32 defines a sixth index regarding eco-driving. Specifically, the control unit 32 determines the idling of each worker's vehicle and a traveling distance thereof by using a traveling history of the vehicle. Here, the control unit 32 may calculate the traveling history of the vehicle by using the real-time location information such as the GPS information. Using the determined idling and the determined traveling distance, the control unit 32 calculates a sixth achievement score that reflects an eco-driving state.

For example, the control unit 32 computes an average idling time with respect to a working time and compares an actual traveling distance with the optimum route to determine whether an actual route deviates from a permitted limit. If the idling and the traveling distance do not exceed a given eco-standard, the control unit 32 determines that the eco-driving state is a good state. If the idling and the traveling distance exceed the eco-standard, the control unit 32 determines that the eco-driving state is a poor state. Then, the control unit 32 may calculate the sixth achievement score so that the achievement score is higher in the good state than in the poor score. Preferably, the control unit 32 may classify poor states by error ranges and calculate the sixth achievement score to be lower as the error range becomes larger.

The control unit 32 defines a seventh index regarding a worker's abnormal behavior. For example, the control unit 32 determines the abnormal behavior by using the traveling history of the vehicle and an oiling record thereof. Here, the oiling record means the details of a worker's oiling card. That is, the control unit 32 collates the position and time of a gas station recorded in the oiling card with the travelling history to determine whether the oiling card is used for another purpose. In addition, the control unit 32 monitors whether the worker deviates from the route. If no abnormal behavior is found, the control unit 32 determines that a worker's behavior is in a good state. If any abnormal behavior is found, the control unit 32 determines that the worker's behavior is in a poor state. The control unit 32 may classify poor states by error ranges and calculate the seventh achievement score to be lower as the error range becomes larger.

The control unit 32 calculates the KPI by using at least one of the first to seventh achievement scores for the first to seventh indexes. That is, the control unit 32 may calculate the KPI by selecting a suitable index for an environment in which a field service is performed.

In addition, the control unit 32 evaluates the working status of each worker by using the calculated KPI and generates the working status evaluation result for each worker. The control unit 32 may analyze the working status of each worker from the KPI and generate the working status evaluation result per worker by using analyzed results.

In addition, based on the working status evaluation result per worker, the control unit 32 may determine the working status ranking of all workers. Also, the control unit 32 may find specific matters such as an improvement-required matter, an indicated matter, and a recommended matter for each individual worker so that the manager easily manages the workers.

Meanwhile, the control unit 32 is not limited to calculating the KPI based on seven indexes as described above. For calculation of the KPI, the types and numbers of the indexes may be selectively determined depending on the field service type and the environment.

The output unit 33 outputs the KPI of each worker and the working status evaluation result for each worker both of which are calculated or generated by the control unit 32. The output unit 33 may include a display, a printer, a projector, and the like. The display may be a liquid crystal display (LCD), a thin film transistor liquid crystal display (TFT LCD), an organic light-emitting diode (OLED), a flexible display, or a three-dimensional (3D) display.

The storage unit 34 stores the schedule information, the real-time location information such as the GPS information, and the current service status information all of which are received through the communication unit 31. In addition, the storage unit 34 stores the KPI for each worker and the working status evaluation result for each worker both of which are calculated or generated by the control unit 32. The storage unit 34 may be a flash memory, a hard disk, a multimedia card, a card type memory (e.g., SD or XD memory), a random access memory (RAM), a static RAM (SRAM), a read-only memory (ROM), a programmable read-only memory (PROM), an electrically erasable programmable read-only memory (EEPROM), a magnetic memory, a magnetic disk, an optical disk, or any other kind of storage medium.

Figure 3:
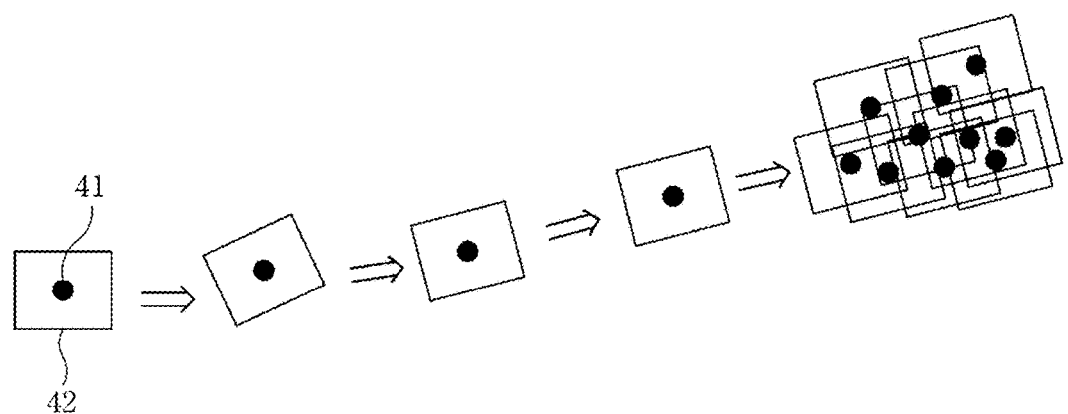
FIG. 3 is a diagram illustrating a stop event according to an embodiment of the present invention.

FIG. 3 is a diagram illustrating a stop event according to an embodiment of the present invention.

Referring to FIG. 3, the control unit 32 determines a current state of the worker, based on a stop event.

Specifically, the control unit 32 generates a point 41 indicating a worker's current location and a current time by using the real-time location information such as the GPS information, and also generates a virtual region 42 surrounding the generated point 41. Thereafter, if a predetermined number of virtual regions 42 are overlapped with each other for a given time, the control unit 32 determines that a stop event occurs. That is, in this disclosure, the stop event refers to an occurrence that the worker stays at a certain place for a given time.

When the worker moves, the point 41 generated by the control unit 32 also moves. Therefore, in this case, the virtual region 42 does not overlap with previous virtual regions. However, when the worker stops without moving, the points 41 generated by the control unit 32 accumulate in a certain range, and also the virtual regions 42 continuously overlap. If this overlap is detected predetermined times or more for a given time, the control unit 32 determines that the stop event occurs. If the number of overlapped virtual regions is smaller than the predetermined number, this overlap may not be considered as the stop event.

For example, if a generation period of the point 41 is one minute, and if a detection period of the virtual region 42 is ten minutes, the control unit 32 may determine that the stop event occurs when ten virtual regions 42 are overlapped.

Figure 4:
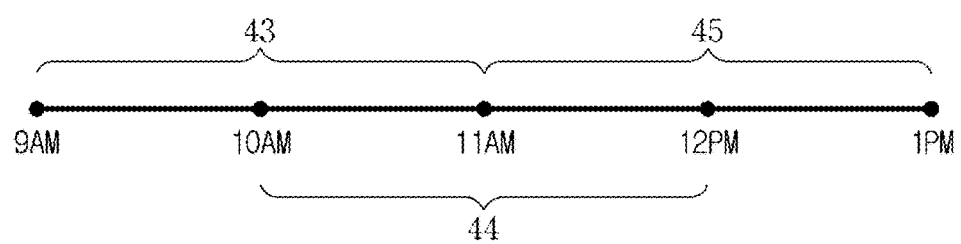
FIG. 4 is a diagram illustrating a visit time management according to an embodiment of the present invention.

FIG. 4 is a diagram illustrating a visit time management according to an embodiment of the present invention.

Referring to FIG. 4, a visit time of each worker is managed on the basis of the time range defined in the schedule information.

The time range is defined in the schedule information so that a visit time range for a certain service is overlapped with a visit time range for the previous service and/or a visit time range for the next service. This allows the worker to design a desired visit plan by flexibly selecting an arrival time, a working time, and a departure time.

For example, the time range defined in the schedule information may apply a 2-hour compliance rule. The 2-hour compliance rule is to set visit times in units of two hours while allowing each visit time to be overlapped with the previous visit time and/or the next visit time. That is, in case of defining the time range with respect to three visits as shown, the 2-hour compliance rule sets a first visit time 43 from 9 am to 11 am, sets a second visit time 44 from 10 am to noon, and sets a third visit time 45 from 11 am to 1 pm. In this case, the worker may make the first visit at any time between 9 am and 11 am, make the second visit at any time between 10 am and noon, and make the third visit at any time between 11 am to 1 pm. This allows the worker to adjust the schedule flexibly depending on a field situation, thereby improving work efficiency while keeping every visit time.

Meanwhile, the visit time range is not limited to 2 hours and may be freely defined depending on a service environment or the like.

Figure 5:
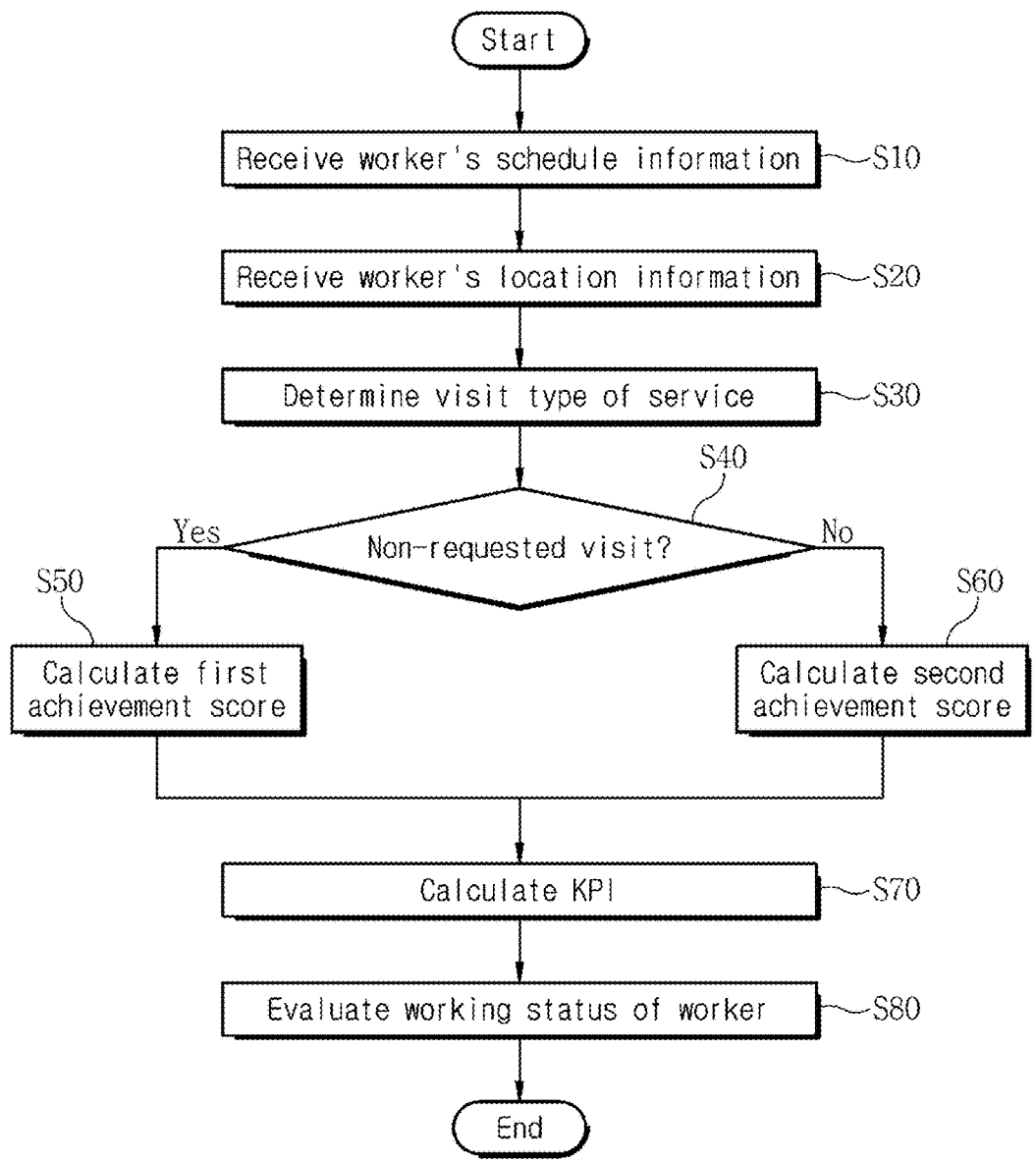
FIG. 5 is a flow diagram illustrating a field service monitoring method according to an embodiment of the present invention.

FIG. 5 is a flow diagram illustrating a field service monitoring method according to an embodiment of the present invention.

Referring to FIGS. 1 and 5, the field service monitoring method is to monitor service processes of workers performing field services through schedule information, real-time location information such as GPS information, and current service status information. The field service monitoring method includes calculating the KPI for a predefined index by using the monitoring results. Thus, the field service monitoring method may provide a basis for objectively evaluating the working status of each worker. In addition, the field service monitoring method allows evaluating the working status of each worker by means of numerical data, checking efficiently and objectively an improvement-required matter or an indicated matter of each work, and inducing the worker to supplement deficient parts.

At step S10, the field service monitoring apparatus 30 receives the schedule information for workers from the plurality of worker terminals 10. The schedule information includes scheduled visit information for each worker.

At step S20, the field service monitoring apparatus 30 receives the real-time location information, e.g., the GPS information, for workers from the plurality of worker terminals 10. The real-time location information includes information about a current location of each worker and about a current time.

At step S30, the field service monitoring apparatus 30 determines a visit type of a service for each worker. Specifically, the field service monitoring apparatus 30 may determine the visit type of the service by using the schedule information and the real-time location information such as the GPS information. That is, the field service monitoring apparatus 30 classifies visit types into a non-requested visit and a requested visit.

At step S40, the field service monitoring apparatus 30 determines whether the visit type is the non-requested visit. If so, step S50 is performed. If the visit type is not the non-requested visit, namely if the visit type is the requested visit, S60 is performed.

At step S50, the field service monitoring apparatus 30 calculates a first achievement score. Specifically, the field service monitoring apparatus 30 regards the non-requested visit an unauthorized or abnormal visit based on personal contact between a worker and a customer without a formal acceptance, distinguishes it from the requested visit, and calculates the first achievement score to which a penalty score is applied.

At step S60, the field service monitoring apparatus 30 calculates a second achievement score. For this, the types of the requested visit may be classified into a new visit and a revisit. The field service monitoring apparatus 30 determines whether the requested visit is a new visit or a revisit, using the schedule information, then checks a service completion status, using the service status information, and calculates the second achievement score.

At step S70, the field service monitoring apparatus 30 calculates the KPI. For example, using the first achievement score and the second achievement score, the field service monitoring apparatus 30 acquires the KPI.

At step S80, the field service monitoring apparatus 30 evaluates a working status of each worker. Specifically, the field service monitoring apparatus 30 analyzes the working status of each worker from the KPI and generates a working status evaluation result per worker by using the analyzed results. Then, the field service monitoring apparatus 30 transmits the generated working status evaluation results to the manager terminal 50.

Through the above, the manager may easily find specific matters such as an improvement-required matter, an indicated matter, and a recommended matter for each individual worker.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

According to various embodiments, at least a part of the apparatus (e.g., modules or functions thereof) or the method (e.g., operations) may be implemented, for example, as instructions stored in a non-transitory computer-readable storage medium in a programming module form. When the instructions are executed, a processor (e.g., the control unit 32) may perform particular functions corresponding to the instructions. The computer-readable storage medium may be, for example, the storage unit 34.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa.

While this disclosure has been particularly shown and described with reference to an exemplary embodiment thereof, it will be understood by those skilled in the art that various changes in form and details may be made therein without departing from the scope of the present invention as defined by the appended claims.

What is claimed is:

1. An apparatus for field service monitoring comprising:
a communication unit configured to receive schedule information, real-time location information, and service status information including service completion information from a terminal of a worker via a communication network; and
a control unit configured to determine a type of a stop event of the worker based on the schedule information and the real-time location information,
wherein the control unit is configured to:
determine a plurality of points each indicating the worker's current location and a current time at the point based on the real-time location information,
determine a plurality of virtual regions surrounding the determined points,
determine that a stop event occurs when a predetermined number of the virtual regions overlap each other for a given time period,
determine that the stop event is a non-requested visit when the stop event does not match an area included in the schedule information, and
determine that the stop event is a requested visit when the stop event matches an area included in the schedule information,
wherein the control unit is further configured to, for the worker, calculate a first achievement score having a penalty score for the non-requested visit when the stop event is a non-requested visit, to calculate a second achievement score having a new service completion rate by using the schedule information and the service status information when the stop event is a requested visit, to calculate a key performance indicator (KPI) based on the first and second achievement scores, and to evaluate a working status by using the calculated KPI,
wherein the control unit is further configured to classify the requested visit into a new visit and a revisit, and to classify the revisit into a reschedule visit and a reclaim visit, the reschedule visit being made after no completion of a service in the new visit, and the reclaim visit being made for a same reason after completion of the service, and
wherein the control unit is further configured to calculate a third achievement score having a penalty score for reclaim when the revisit is the reclaim visit, and to calculate the KPI based on the third achievement score.

2. The apparatus of claim 1, wherein the control unit is further configured to calculate the second achievement score based on the following Equation:

Second achievement score={the total number of visits−(the number of uncompleted services in new visits+the number of revisits)}/the total number of visits, [Equation]

where the total number of visits denotes the sum of new visits and revisits.

3. The apparatus of claim 1, wherein the control unit is further configured to determine the reclaim visit as the new visit when a worker performing the reclaim visit is not a previous visit worker for a same service and a same customer.

4. The apparatus of claim 1, wherein the control unit is further configured to determine a visit time based on the real-time location information, to calculate a fourth achievement score reflecting a visit time compliance state based on the determined visit time, and to calculate the KPI by further using the fourth achievement score.

5. The apparatus of claim 4, wherein the control unit is further configured to determine that the visit time compliance state is a good state when the visit time falls within a time range defined in the schedule information, and to determine that the visit time compliance state is a poor state when the visit time exceeds the time range.

6. The apparatus of claim 5, wherein the time range is defined in the schedule information so that a visit time range for a certain service overlaps at least one of a visit time range for the previous service and a visit time range for the next service.

7. The apparatus of claim 1, wherein the control unit is further configured to:
    calculate a fifth achievement score reflecting a safe driving state of each worker, based on a traveling speed of each worker's vehicle determined using the real-time location information,
    calculate a sixth achievement score reflecting an eco-driving state, based on idling and a traveling distance of the vehicle determined using a traveling history of the vehicle,
    calculate a seventh achievement score reflecting a worker's abnormal behavior, based on a traveling history and an oiling record of the vehicle, and
    calculate the KPI by further using at least one of the fifth, sixth, and seventh achievement scores.

8. A method for field service monitoring comprising:
    at a field service monitoring apparatus, receiving schedule information from a terminal of a worker via a communication network; at the field service monitoring apparatus, receiving real-time location information and service status information of the worker via the communication network;
    at the field service monitoring apparatus, determining a type of a stop event of the worker based on the schedule information and the real-time location information, wherein the field service monitoring apparatus determines a plurality of points each indicating the worker's current location and a current time at the point based on the real-time location information, determines a plurality of virtual regions surrounding the determined points, determines that a stop event occurs when a predetermined number of the virtual regions overlap each other for a given time period, determines that the stop event is a non-requested visit when the stop event does not match an area included in the schedule information, and determines that the stop event is a requested visit when the stop event matches an area included in the schedule information;
    at the field service monitoring apparatus, for the worker, calculating a first achievement score having a penalty score for the non-requested visit when the stop event is a non-requested visit, and calculating a second achievement score having a new service completion rate based on the schedule information and the service status information when the stop event is a requested visit;
    at the field service monitoring apparatus, classifying the requested visit into a new visit and a revisit, classifying the revisit into a reschedule visit and a reclaim visit, and calculating a third achievement score having a penalty score for reclaim when the revisit is the reclaim visit, wherein the reschedule visit is made after no completion of a service in the new visit, and wherein the reclaim visit is made for a same reason after completion of the service;
    at the field service monitoring apparatus, calculating a key performance indicator (KPI) for each worker based on the first, second, and third achievement scores; and
    at the field service monitoring apparatus, evaluating a working status of each worker based on the calculated KPI.

* * * * *